US007884806B2

(12) United States Patent
Trent, Jr.

(10) Patent No.: US 7,884,806 B2
(45) Date of Patent: Feb. 8, 2011

(54) PROXIMITY SENSOR DEVICE AND METHOD WITH KEYBOARD EMULATION

(75) Inventor: Raymond Alexander Trent, Jr., San Jose, CA (US)

(73) Assignee: Synaptics Incorporated, Santa Clara, CA (US)

(*) Notice: Subject to any disclaimer, the term of this patent is extended or adjusted under 35 U.S.C. 154(b) by 686 days.

(21) Appl. No.: 11/748,037

(22) Filed: May 14, 2007

(65) Prior Publication Data

US 2008/0284736 A1 Nov. 20, 2008

(51) Int. Cl.
*G06F 3/041* (2006.01)
(52) U.S. Cl. ........................................ 345/173; 345/168
(58) Field of Classification Search .......... 345/156–174
See application file for complete search history.

(56) References Cited

U.S. PATENT DOCUMENTS

| | | | | |
|---|---|---|---|---|
| 5,491,495 A | * | 2/1996 | Ward et al. ................ | 345/173 |
| 5,590,315 A | * | 12/1996 | Hess et al. ................. | 703/25 |
| 5,666,113 A | | 9/1997 | Logan | |
| 6,037,930 A | | 3/2000 | Wolfe et al. | |
| 2001/0033268 A1 | * | 10/2001 | Jiang ....................... | 345/163 |
| 2003/0201971 A1 | | 10/2003 | Iesaka | |
| 2007/0126714 A1 | * | 6/2007 | Imamura .................. | 345/173 |

FOREIGN PATENT DOCUMENTS

WO   01/18966 A1   3/2001

OTHER PUBLICATIONS

"Keyboard Controller Functions," www.pcguide.com/ref/mbsys/chip/kbctrl-c.html, printed on Jul. 31, 2007, 2 pages.
International Search Report for International Application No. PCT/US2008/060224, mailed Aug. 6, 2008.

* cited by examiner

*Primary Examiner*—Amare Mengistu
*Assistant Examiner*—Hong Zhou
(74) *Attorney, Agent, or Firm*—Ingrassia Fisher & Lorenz, P.C.

(57) ABSTRACT

A proximity sensor device and method is provided that facilitates improved device usability by providing a at least one control function prior to the specialized host software loading, and then switch to provide full range of functionality when the specialized host software has been loaded. In one embodiment, the proximity sensor device comprises a proximity sensor adapted to detect object presence and a controller configured to output simulated keyboard information and output object positional information. For example, when operating in a first mode prior to the specialized host software loading the controller outputs the simulated keyboard information that indicates a control function to a keyboard controller. Then, when operating in a second mode after the specialized host software has been loaded, the controller outputs object positional information to the keyboard controller. The object positional information can be used to provide a full range of user interface functions.

21 Claims, 7 Drawing Sheets

PROXIMITY SENSOR DEVICE AND METHOD WITH KEYBOARD EMULATION

FIELD OF THE INVENTION

This invention generally relates to electronic devices, and more specifically relates to proximity sensor devices and using a proximity sensor device for producing user interface inputs.

BACKGROUND OF THE INVENTION

Proximity sensor devices (also commonly called touch pads or touch sensor devices) are widely used in a variety of electronic systems. A proximity sensor device typically includes a sensing region, often demarked by a surface, which uses capacitive, resistive, inductive, optical, acoustic and/or other technology to determine the presence, location and/or motion of one or more fingers, styli, and/or other objects. The proximity sensor device, together with finger(s) and/or other object(s), can be used to provide an input to the electronic system. For example, proximity sensor devices are used as input devices for larger computing systems, such as those found integral within notebook computers or peripheral to desktop computers. Proximity sensor devices are also used in smaller systems, including: handheld systems such as personal digital assistants (PDAs), remote controls, communication systems such as wireless telephones and text messaging systems. Increasingly, proximity sensor devices are used in media systems, such as CD, DVD, MP3, video or other media recorders or players.

One common application for a proximity sensor device is as an input device for interacting with a user interface, or UI. A typical UI includes a screen for displaying graphical and/or textual elements. In these applications the proximity sensor device can function as a value adjustment device, cursor control device, selection device, scrolling device, graphics/character/handwriting input device, menu navigation device, gaming input device, button input device, keyboard and/or other input device.

One issue with some past proximity sensor devices is that their functionality commonly requires the loading of a specialized piece of host software, commonly referred to as a type of specialized device driver, on the electronic system before the proximity sensor device can provide input to the system. For example, in a typical laptop computer system the proximity sensor device cannot be used for certain types of input until the operating system and the associated drivers have been loaded into the system. This prevents the proximity sensor device from being used for certain types of input during startup or in cases where the specialized host software has failed to properly load. This undesirably limits the functionality of proximity sensor device.

Thus, there exists a need for improvements in proximity sensor device usability that facilitates the use of proximity sensor devices as interface devices without requiring loading of the specialized host software onto the system.

BRIEF SUMMARY OF THE INVENTION

The embodiments of the present invention provide a proximity sensor device and method that facilitates improved device usability. Specifically, the proximity sensor device and method provide control functionality without requiring loading of a specialized piece of host software for the proximity sensor device. For example, the proximity sensor device can be used to provide a limited set of control functions prior to the specialized host software loading, and then switch to provide full range of functionality when the specialized host software has been loaded.

In one embodiment, the proximity sensor device comprises a proximity sensor adapted to detect object presence and a controller. The controller is configured to output simulated keyboard information responsive to detected object presence and is further configured to output object positional information in response to detected object presence. For example, when operating in a first mode prior to the specialized host software loading the controller outputs the simulated keyboard information to a keyboard controller. The simulated keyboard information can be used to provide one or more functions, such as a media control functions that can be made available prior to the loading of the specialized host software. Then, when operating in a second mode after the specialized host software has been loaded, the controller outputs object positional information to the keyboard controller. The object positional information can be used to provide a full range of user interface functions, such as cursor control and other functions that use object positional information. Thus, the system and method provide a proximity sensor device and method provides control functionality prior to the loading of the specialized host software, and full functionality after loading of the specialized host software.

BRIEF DESCRIPTION OF DRAWINGS

The preferred exemplary embodiment of the present invention will hereinafter be described in conjunction with the appended drawings, where like designations denote like elements, and.

DETAILED DESCRIPTION OF THE INVENTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

The embodiments of the present invention provide a proximity sensor device and method that facilitates improved device usability. Specifically, the proximity sensor device and method provide control functionality without requiring loading of specialized host software for the proximity sensor device. For example, the proximity sensor device can be used to provide a limited set of control functions prior to the specialized host software loading, and then switch to provide a full range of functionality when the specialized host software has been loaded. This can be used to provide user input during startup, or when in a lower power operating mode where the main processor has been powered down. Likewise, the proximity sensor device can be used to provide the set of control functions in applications when the specialized host software has been corrupted or is otherwise unavailable for any reason.

Figure 1:
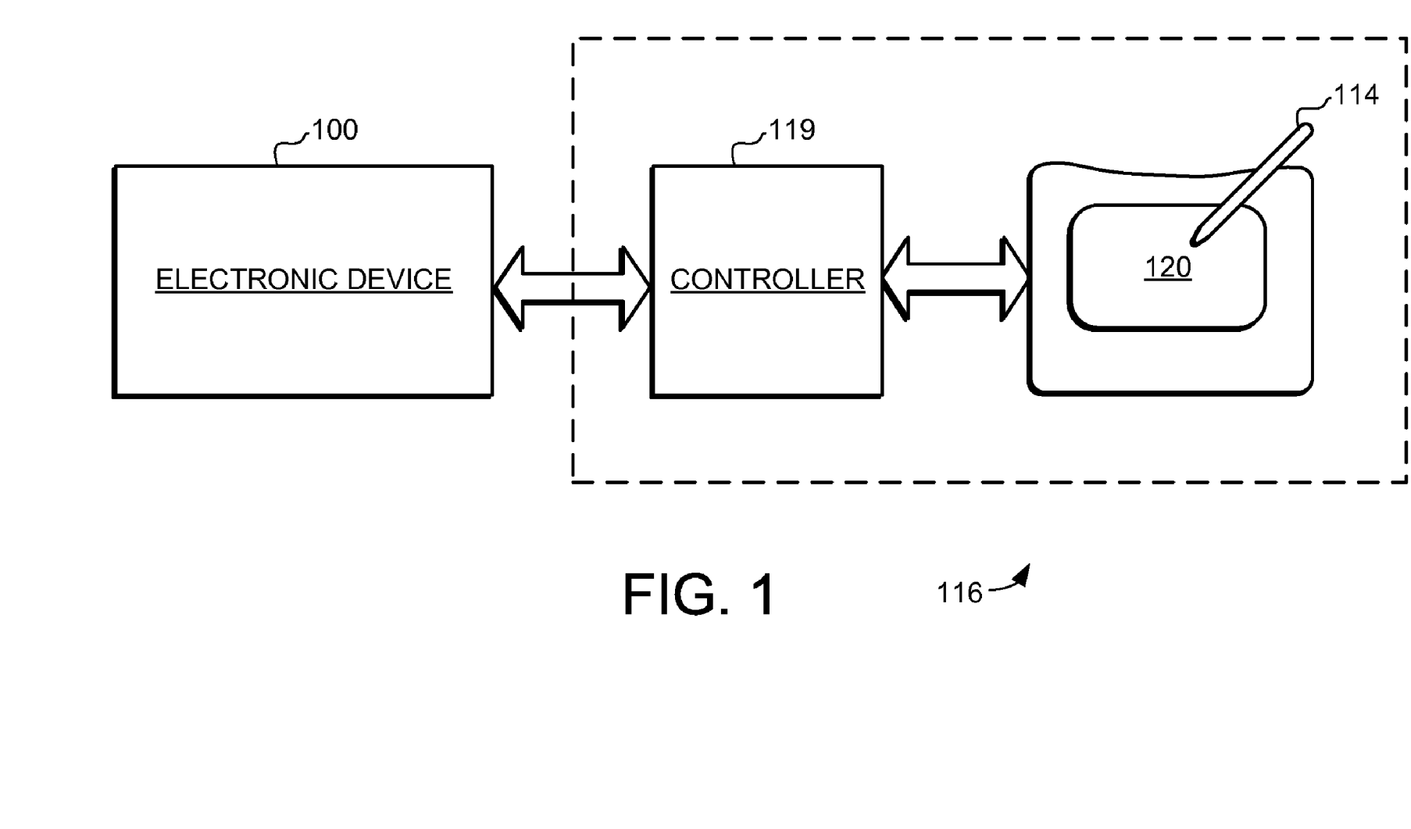
FIG. 1 is a block diagram of an exemplary system that includes a proximity sensor device in accordance with an embodiment of the invention.

In one embodiment, the proximity sensor device comprises a proximity sensor adapted to detect object presence and a controller coupled to an electronic device. Turning now to the drawing figures, FIG. 1 is a block diagram of an exemplary electronic device 100 that is coupled to a proximity sensor device 116. Electronic device 100 is meant to represent any type of personal computer, portable computer, workstation, personal digital assistant, video game player, communication device (including wireless phones and messaging devices), media device, including recorders and players (including televisions, cable boxes, music players, and video players) or other device capable of accepting input from a user and of processing information. Accordingly, the various embodiments of device 100 may include any type of processor, memory or display. Additionally, the elements of device 100 may communicate via a bus, network or other wired or wireless interconnection. The proximity sensor device 116 can be connected to the device 100 through any type of interface or connection, including I2C, SPI, PS/2, Universal Serial Bus (USB), Bluetooth, RF, IRDA, keyboard scanlines or any other type of wired or wireless connection to list several non-limiting examples.

Proximity sensor device 116 includes a controller 119 and a sensing region 120. In general, the proximity sensor device 116 includes electrodes or other structures that are adapted to detect object presence. The proximity sensor device 116 is thus sensitive to the position of one or more input objects, such as a stylus 114, finger and/or other input object within the sensing region 120. "Sensing region" 120 as used herein is intended to broadly encompass any space above, around, in and/or near the proximity sensor device 116 wherein the proximity sensor is able to detect a position or motion of the object. In a conventional embodiment, sensing region 120 extends from the surface of the sensor in one or more directions for a distance into space until signal-to-noise ratios prevent object detection. This distance may be on the order of less than a millimeter, millimeters, centimeters, or more, and may vary significantly with the type of position sensing technology used and the accuracy desired. Other embodiments may require contact with the surface, either with or without applied pressure. Accordingly, the planarity, size, shape and exact locations of the particular sensing region 120 will vary widely from embodiment to embodiment.

In operation, proximity sensor device 116 suitably detects the stylus 114, finger or other input object(s) within sensing region 120, and using controller 119, provides indicia of the detected object to the electronic device 100. The electronic device 100 appropriately processes the indicia to generate the appropriate response, as will be discussed in greater detail below.

Proximity sensor device 116 includes a sensor (not shown) that utilizes any combination of sensing technology to implement one or more sensing regions 120. The proximity sensor device 116 can use a variety of techniques for detecting the presence of an object, and will include one or more electrodes or other structures adapted to detect object presence. As several non-limiting examples, the proximity sensor device 116 can use capacitive, resistive, inductive, surface acoustic wave, or optical techniques. These techniques are advantageous to ones requiring moving mechanical structures (e.g. mechanical switches) that more easily wear out over time. In a common capacitive implementation of a touch sensor device a voltage is typically applied to create an electric field across a sensing surface. A capacitive proximity sensor device 116 would then detect the position of an object by detecting changes in capacitance caused by the changes in the electric field due to the object. Likewise, in a common resistive implementation a flexible top layer and a bottom layer are separated by insulating elements, and a voltage gradient is created across the layers. Pressing the flexible top layer creates electrical contact between the top layer and bottom layer. The resistive proximity sensor device 116 would then detect the position of the object by detecting the voltage output due to the relative resistances between driving electrodes at the point of contact of the object. In an inductive implementation, the sensor might pick up loop currents induced by a resonating coil or pair of coils, and use some combination of the magnitude, phase and/or frequency to determine distance, orientation or position. In all of these cases the proximity sensor device 116 detects the presence of the object and delivers indicia of the detected object to the device 100. These types of technologies are advantageous to ones requiring moving mechanical structures (e.g. mechanical switches) that more easily wear out over time. For example, the sensor of proximity sensor device 116 can use arrays of capacitive sensor electrodes to support any number of sensing regions 120. As another example, the sensor can use capacitive sensing technology in combination with resistive sensing technology to support the same sensing region 120 or different sensing regions 120. Examples of the type of technologies that can be used to implement the various embodiments of the invention can be found at U.S. Pat. Nos. 5,543,591, 6,259,234 and 5,815,091, each assigned to Synaptics Inc.

The controller 119 is coupled to the sensor and the electronic device 100. In general, the controller 119 receives electrical signals from the sensor, processes the electrical signals, and communicates with the electronic device 100. The controller 119 can perform a variety of processes on the signals received from the sensor to implement the proximity sensor device 116. Furthermore, the controller 119 may contain circuitry to drive the sensor electrodes directly, or it may communicate with other devices that drive sensor electrodes to detect object presence.

In accordance with the embodiments of the invention, the controller 119 is configured to output simulated keyboard information and object positional information to the electronic device 100. In this specification, the term "controller" is thus defined to include one or more processing elements that are adapted to perform the recited operations. Thus, the controller 119 can comprise all or part of one or more integrated circuits, firmware code, and/or software code that receive electrical signals from the sensor and communicate with the electronic device 100. In some embodiments, the elements that comprise the controller 119 would be located with or near the sensor. In other embodiments, some elements of the controller 119 would be with the sensor and other elements of the controller 119 would reside on or near the electronic device 100.

The simulated keyboard information provided by the controller 119 can include any type of information that simulates the output of a keyboard to the electronic device 100. As one example, the simulated keyboard information can comprise sets of binary values called scan codes, where each scan code indicates one or more functions on the electronic device 100 in a form typically used by keyboards. An example of such a scan code would be the hexadecimal value 1C, which is commonly interpreted as a command to input the letter "A". Some other scan codes might comprise multiple bytes, such as the hexadecimal value E07D, which is often interpreted as a "Page Up" command. As another example, the simulated keyboard information can comprise simulated scan line outputs of a keyboard, where "scan lines" are the outputs of key matrix rows and columns of a keyboard. In all these cases the simulated keyboard information provided by the controller 119 allows the proximity sensor device 116 to emulate the output of a keyboard to the electronic device 100. As will be described in greater detail below, this simulated keyboard output allows the proximity sensor device 116 to be used as an input device without requiring the presence of the operation of a specialized host software, and can thus be used to provide input during startup, when the main processor has been powered down, or in other situations where the usage of the specialized host software is undesirable or unavailable.

Likewise, the positional information provided by the controller 119 can be any suitable indicia of object presence. For example, the controller 119 can be implemented to provide "zero-dimensional" 1-bit positional information, "one-dimensional" positional information (e.g. along a sensing region) as a scalar, "two-dimensional" or "three-dimensional" vector positional information (e.g. horizontal/vertical/depth axes, angular/radial axes, or any other combination of axes that span the two or three dimensions) as a combination of values, and the like. Furthermore, the term "positional information" as used herein is intended to broadly encompass absolute and relative position-type information, and also other types of spatial-domain information such as velocity, acceleration, and the like, including measurement of motion in one or more directions. Various forms of positional information may also include time history components, as in the case of gesture recognition and the like. As will be described in greater detail below, the positional information from the controller 119 facilitates a full range of interface inputs, including use of the proximity sensor device 116 as a pointing device for cursor control.

In some embodiments the controller 119 can also be adapted to perform other functions in the proximity sensor device 116. For example, the controller 119 can be configured to select or connect individual sensor electrodes, detect presence/proximity, calculate position or motion information, and report a position or motion when a threshold is reached, and/or interpret and wait for a valid tap/stroke/character/button/gesture sequence before reporting it to the electronic device 100, or indicating it to the user.

It should be noted that although the various embodiments described herein are referred to as "proximity sensor devices", these terms as used herein are intended to encompass not only conventional proximity sensor devices, but also a broad range of equivalent devices that are capable of detecting the position of a one or more fingers, pointers, styli and/or other objects. Such devices may include, without limitation, touch screens, touch pads, touch tablets, biometric authentication devices, handwriting or character recognition devices, and the like. Again, as the term is used in this application, the term "electronic device" broadly refers to any type of device that communicates with proximity sensor device 116. The electronic device 100 could thus comprise any type of device or devices in which a touch sensor device and can be implemented in or coupled to. Accordingly, proximity sensor devices can appropriately detect more than the mere presence or absence of an object and may encompass a broad range of equivalents.

Furthermore, the proximity sensor device could be implemented as part of the electronic device 100, or coupled to the electronic device using any suitable technique. As non-limiting examples the electronic device 100 could thus comprise any type of computing device, media player, communication device or gaming device. In some cases the electronic device 100 is itself a peripheral to a larger system. For example, the electronic device 100 could be a data input or output device, such as a remote control or display device, that communicates with a computer or media system (e.g., remote control for television) using a suitable wired or wireless technique. It should also be noted that the various elements (e.g., display screen, processor, memory, etc.) of the electronic device 100 could be implemented as part of an overall system, as part of the proximity sensor device, or as a combination thereof. Additionally, the electronic device 100 could be a host or a slave to the proximity sensor device 116.

It should also be understood that while the embodiments of the invention are to be described herein the context of a fully functioning proximity sensor device, the mechanisms of the present invention are capable of being distributed as a program product in a variety of forms. For example, the mechanisms of the present invention can be implemented and distributed as a proximity sensor program on a computer-readable signal bearing media. Additionally, the embodiments of the present invention apply equally regardless of the particular type of computer-readable signal bearing media used to carry out the distribution. Examples of signal bearing media include: recordable media such as memory sticks/cards/modules, optical and magnetic disks, hard drives.

As described above, the embodiments of the proximity sensor device 116 facilitate control functionality without requiring loading of specialized host software for the proximity sensor device 116. For example, the proximity sensor device 116 can be used to provide a limited set of control functions prior to the specialized host software loading, and then switch to provide full functionality when the specialized host software has been loaded.

In these embodiments, the controller 119 is configured to output simulated keyboard information responsive to detected object presence and is further configured to output object positional information in response to detected object presence. For example, when operating in a first mode prior to the specialized host software loading the controller 119 outputs the simulated keyboard information to the electronic device 100. The simulated keyboard information can be used to provide one or more functions, such as a media control functions that can be made available prior to the loading of the specialized host software on the electronic device 100. Then, when operating in a second mode after the specialized host software has been loaded, the controller 119 outputs object positional information to the electronic device 100. The object positional information can be used to provide a wide range of user interface functions on the electronic device 100, such as cursor control and other functions that use object positional information. Thus, the proximity sensor device 116 provides control functionality prior to the loading of the specialized host software, and a full range of functionality after loading of the specialized host software. This allows the proximity sensor device to be used during startup, or in any situation in which the specialized host software is not available or when it is not desirable.

After loading of the specialized host software, the embodiments of the invention can be used to provide an even wider range of functions. For example, using the positional information provided by the proximity sensor 116 and gesture recognition provided by the specialized host software, the proximity sensor device 116 can be used to provide cursor control, scrolling, panning, dragging, and a wide range of other user interface functions. Additionally, the functions provided by the proximity sensor device 116 can be highly configurable using the specialized host software. Thus, a user can configure the functions, locations and context dependencies of the how the proximity sensor device 116 responds to object presence. As specific examples, the proximity sensor device 116 can be used to provide multi-media buttons that are highly configurable for particular applications using the specialized host software.

It should be noted that the proximity sensor device 116 is thus providing both simulated keyboard information and positional information in response to object presence proximate the sensing region. Thus, an object proximate a specific portion of the sensing region will produce simulate keyboard in the first instance, and then an object proximate the same specific portion will produce positional information in the second instance. Thus, the proximity sensor device 116 produces two types of data in response to object presence at same location in the sensing region.

The embodiments of the invention can be used to provide a variety of different control functions on the electronic device without the specialized host software. For example, the control functions can comprise media player functions, such as stop, play, record, volume etc. The control functions can also system device control functions, such as starting to a safe mode or switching functions and peripherals on or off. Other examples include sequences of scan codes that initiate actions in typical applications. One such sequence would be scan codes indicating the pressing of a "Control" key followed by the letter "S", and subsequent releasing of those keys. In many applications on the common PC operating systems, this scan code sequence would save the application's current data. A wide variety of functions can be initiated with keyboard input, as a suitable sequence of keystrokes can initiate almost any action the operating system is capable of. For example, the Windows operating system allows the running of any arbitrary application by typing a special "Windows Key" in combination with the letter "R", and then typing the entire filename path of the application to run and any command line parameters of the application. In all these cases, object presence near a portion of the sensing region causes the controller 119 to output simulated keyboard information, such as an appropriate scan code that initiates the corresponding function to the electronic device.

In addition to facilitating control functions prior to the specialized host software loading, the proximity sensor device 116 can be used to provide this functionality for electronic devices for which no specialized host software is available. This would be useful for devices that can boot several operating systems, and where specialized host software is not available for all of the operating systems.

The embodiments of the invention are particularly applicable to computer devices such as portable personal computers. Computing devices commonly include keyboard controllers, which serve as an interface between keyboards, auxiliary input devices and the main bus of the computer itself. In general, keyboard controllers receive data from a keyboard and other auxiliary input devices, format that data, and output the data to a host device. In this application, the term "keyboard controller" is thus defined to include any processing device that is adapted to receive data from a keyboard and/or an auxiliary input device, process the data, and pass the processed data to the host electronic device. Keyboard controllers can thus be separate devices, or can be implemented on multifunction controller devices. Furthermore, in some applications keyboard controllers are implemented using general purpose embedded controllers that run specialized keyboard controller software. Other keyboard controllers are implemented using multifunction I/O devices, such as a "Super I/O" device. Some keyboard controllers are configured to receive keyboard data in the form of scan codes discussed above. Keyboard controllers can also be configured to read scan lines. These keyboard controllers input voltages onto rows of a key matrix in the keyboard and read the values out on the columns, called "scan lines".

As one example, the keyboard controller can comprise an active PS/2 multiplexing keyboard controller, commonly found in many personal computers. These types of keyboard controllers are adapted to receive data from keyboards using a standard protocol such as PS/2, or by scanning the keyboard for activity on individual keys. These keyboard controllers process the keyboard data, and output the processed data to the host electronic device, typically in the form of numeric data called scan codes discussed above. Additionally, these keyboard controllers are adapted to receive auxiliary data from pointing devices, such as computer mice, trackballs or touch pads. These keyboard controllers process the pointing device data, and output the processed auxiliary data in a form that represents position or motion.

Typically, the keyboard data is received by the keyboard controller through one or more keyboard ports. Likewise, the auxiliary data is received by the keyboard controller through one or more auxiliary ports. Other keyboard controllers have configurable ports that are able to selectively function as either keyboard ports or auxiliary ports. Some configurable ports are dynamically configurable, meaning that the function of the port can be changed from keyboard to auxiliary during operation.

In embodiments employing keyboard controllers, the controller 119 is configured to output simulated keyboard information and object positional information to the keyboard controller. For example, when operating in a first mode prior to the specialized host software loading the controller 119 outputs the simulated keyboard information to a keyboard controller on the electronic device 100. Then, when operating in a second mode after the specialized host software has been loaded, the controller 119 outputs object positional information to the keyboard controller.

Figure 2:
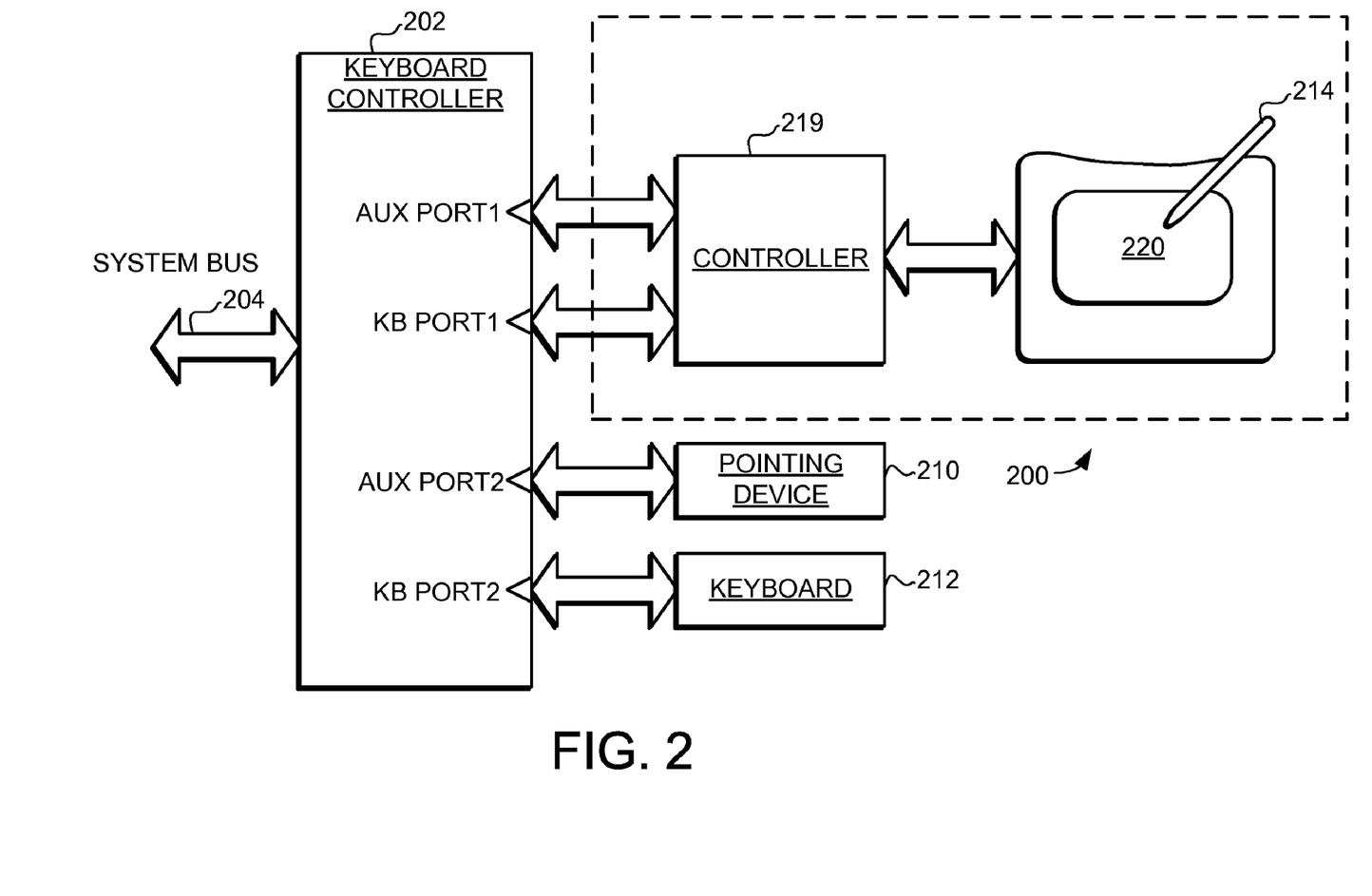
FIGS. 2-5 are block diagrams of proximity sensor coupled to keyboard controllers in accordance with the embodiments of the invention.

Turning now to FIG. 2, a first embodiment of a proximity sensor device 200 is illustrated. The proximity sensor device 200 includes a controller 219 and a sensing region 220, where the proximity sensor device 200 is sensitive to the position of one or more input objects, such as a stylus 214. In the embodiment of FIG. 2, the proximity sensor device 200 is coupled to an electronic device through a keyboard controller 202, which is in turn coupled to a system bus 204 of the electronic device.

Figure 6:
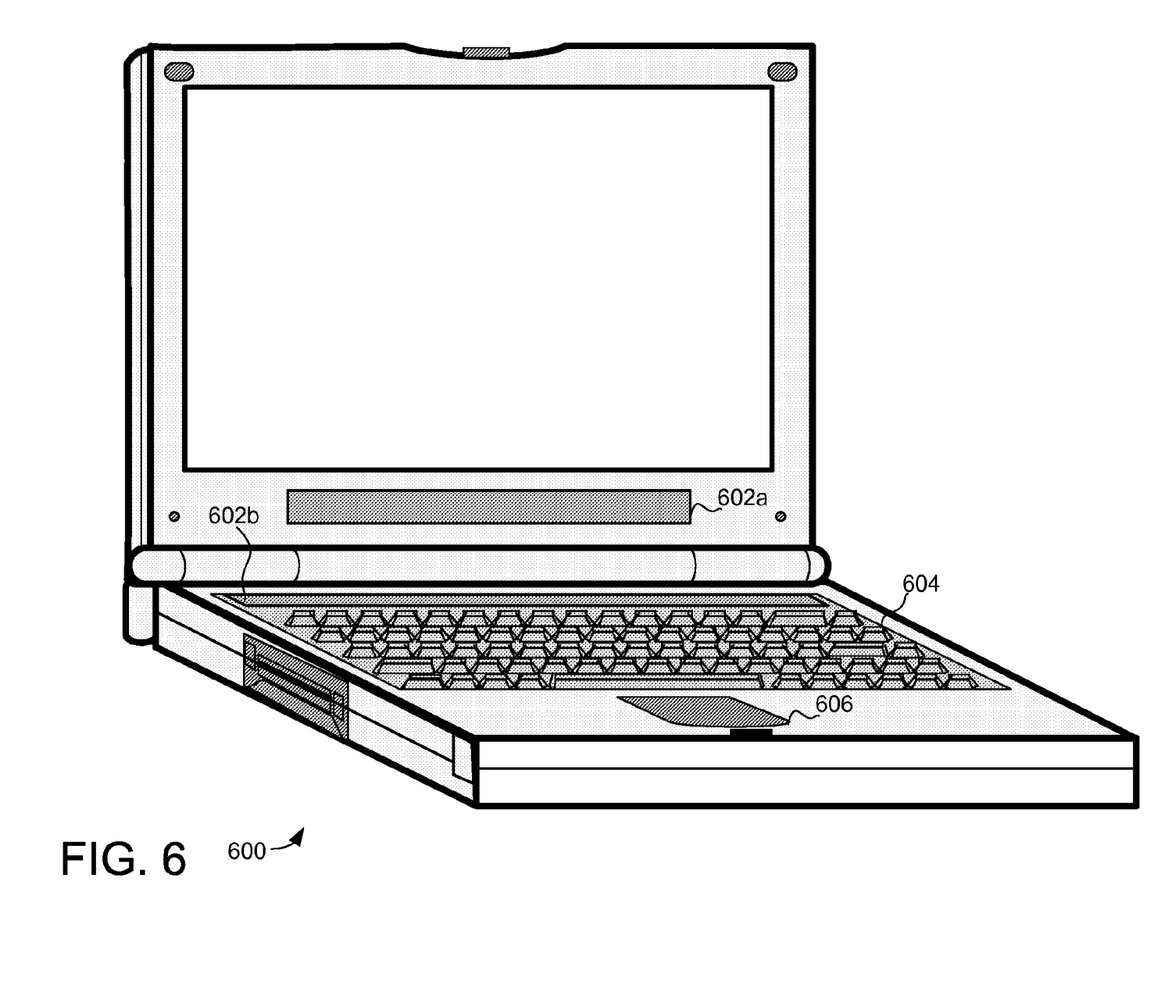
FIG. 6 is a perspective view of a portable computer in accordance with an embodiment of the invention.

In the embodiment illustrated in FIG. 2, the keyboard controller 202 includes two keyboard ports (labeled KB PORT1 and KBPORT2) and two auxiliary ports (labeled AUX PORT1 and AUX PORT2). AUX PORT1 and KB PORT1 are coupled to the controller 219 in the proximity sensor device 200. AUX PORT2 is coupled to another pointing device 210, and KB PORT2 is coupled to a keyboard 212. This illustrates a suitable implementation for the proximity sensor device in a computer that also includes a keyboard and a pointing device. For example, in a laptop computer that includes also a keyboard, a touchpad used for a pointing device. An example of such a device is illustrated in FIG. 6, which will be discussed in greater detail below.

As discussed above, the proximity sensor device 200 is configured to output simulated keyboard information responsive to detected object presence and is further configured to output object positional information in response to detected object presence. For example, when operating in a first mode prior to the specialized host software loading, the controller 219 outputs the simulated keyboard information to the keyboard controller 202 through the keyboard port KB PORT1. During initial operation the controller 219 can identify itself as a keyboard to the keyboard controller 202. Then, in response to sensed objects proximity the sensing region (e.g., user taps on the sensor), the controller can generate an output in the form of simulated keyboard information. The simulated keyboard information can be implemented as scan codes (such as those used by traditional keyboards) that identify one or more functions on the host electronic device. Thus, the keyboard controller 202 receives the simulated keyboard information and initiates the function identified by the scan code, as it would for similar scan code provided by a keyboard. Thus, prior to the specialized host software loading, the proximity sensor device 200 emulates the behavior of a keyboard from the view of the keyboard controller 202. Prior to the specialized host software loading a user can thus cause one or more control functions (as identified to the host electronic device by the scan code) through appropriate object presence in the sensing region.

Then, when operating in a second mode after the specialized host software has been loaded, the controller 219 outputs object positional information. For example, after loading of the specialized host software, the host electronic system will direct the controller 219 to operate as a pointing device with a full range of functionality. In this mode, the controller 219 can report itself as a pointing device to the keyboard controller 202. The controller 219 can then pass positional information to the keyboard controller 202 through the auxiliary port AUX PORT1. Again, this positional information can be in the form of a variety of absolute or relative information, as well as position-derived data such as motion. This positional information is processed by the keyboard controller 202, and is passed to the host electronic device, where the specialized host software is used to interpret the positional information and provide the appropriate response. Thus, after loading of the specialized host software, the proximity sensor device 200 can be used to provide the full range of user interface functions that are implemented on the proximity sensor device. For example, using gesture recognition, the proximity sensor device 200 can be used to provide cursor control, dragging, scrolling, and a wide range of other user interface functions.

As stated above, the keyboard controller 202 is also coupled to pointing device 210 and keyboard 212 through auxiliary port AUX PORT2 and keyboard port KB PORT2 respectively. Thus, the keyboard controller 202 also serves as an interface for a traditional keyboard (such as a PS/2-compatible keyboard) and a pointing device (such as a computer mouse, trackball or other proximity sensor device). In a personal computer application, the proximity sensor device 200 can thus be easily implemented along with the keyboard and pointing device. It should also be noted that since many currently available keyboard controllers already are equipped with multiple keyboard ports and multiple auxiliary ports, that this implementation can be accomplished with relatively low additional cost and complexity.

It should also be emphasized that it is not necessarily required that the controller 219 cease sending simulated keyboard information to the keyboard controller 202 after the specialized host software has been loaded. Instead, both data types can be provided and the keyboard controller 202 configured to determine whether to respond to the simulated keyboard information or the object positional information.

Figure 3:
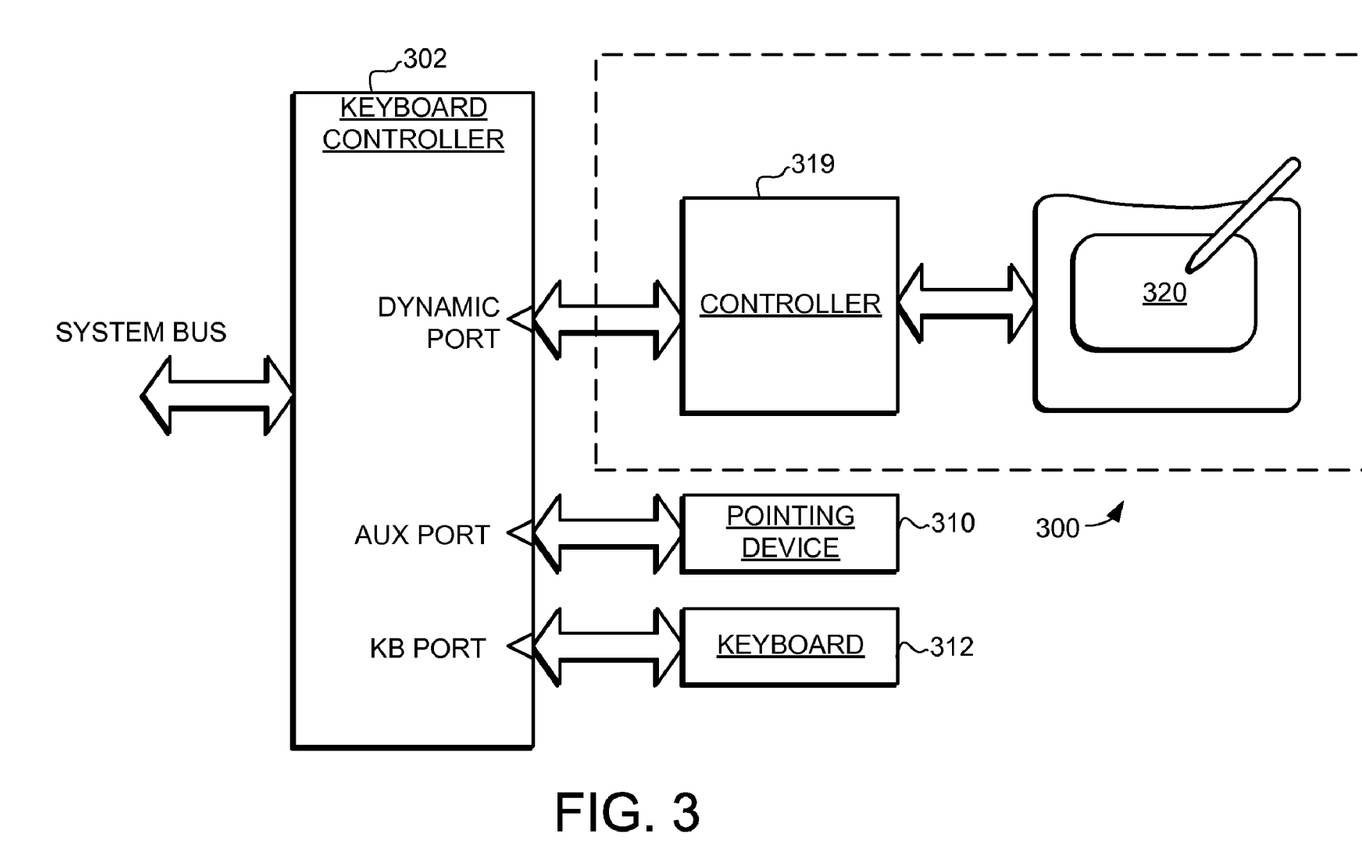

Furthermore, in some applications both the simulated keyboard information and the object positional information can be provided through the same input port on keyboard controller. Turning now to FIG. 3, a second embodiment of a proximity sensor device 300 is illustrated. The proximity sensor device 300 includes a controller 319 and a sensing region 320. Like the embodiment shown in FIG. 2, the proximity sensor device 300 is coupled to an electronic device through a keyboard controller 302, which is in turn coupled to a system bus. In the embodiment illustrated in FIG. 3, the keyboard controller 302 includes a dynamic port (labeled DYNAMIC PORT), a keyboard port (labeled KB PORT) and an auxiliary port (labeled AUX PORT). The dynamic port is coupled to the controller 319 in the proximity sensor device 300. AUX PORT is coupled to a pointing device 310, and KB PORT is coupled to a keyboard 312.

In this type of keyboard controller, the dynamic port is able to function as both a keyboard port, receiving keyboard information such as scan codes, and as an auxiliary port, receiving object positional information. Thus, in this embodiment, both the simulated keyboard information and the object positional information from the controller 319 are provided to the keyboard controller 302 through the dynamic port.

For example, when operating in a first mode prior to the specialized host software loading, the controller 319 can identify itself as a keyboard to the keyboard controller 302. The keyboard controller 302 can then dynamically configure itself to receive keyboard information through the dynamic port.

Then, in response to sensed objects the controller 319 generates simulated keyboard information (e.g., scan codes) and passes the keyboard information to the keyboard controller 302 through the configured dynamic port. The host device can then initiate the function identified by the keyboard information, as it would for similar scan code provided by a keyboard. Thus, prior to the specialized host software the loading, the keyboard controller 302 is configured to receive keyboard information through the dynamic port, and the proximity sensor device 300 emulates the behavior of a keyboard, allowing a user to cause one or more control functions indicated by the scan codes to be performed on the host electronic device.

Then, when operating in a second mode after the specialized host software has been loaded, the host electronic system will direct the controller 319 to operate in a full function mode. In this mode, the controller 319 can report itself as a pointing device to the keyboard controller 302, and can cause the keyboard controller 302 to dynamically configure itself to receive positional information through the dynamic port. Alternately, the specialized host software can instruct the keyboard controller to switch from interpreting the data from the device as keyboard information to interpreting it as an auxiliary pointing device. The positional information is processed by the keyboard controller 302 and is passed to the host electronic device. Thus, after loading of the specialized host software, the proximity sensor device 300 can be used to provide the full range of user interface functions that are available.

Thus, the embodiment illustrated in FIG. 3 operates in a manner similar to that described above with reference to FIG. 2, except that instead of using separate keyboard and auxiliary ports for the proximity sensor device, one dynamically configurable port that can perform both functions is used.

Figure 4:
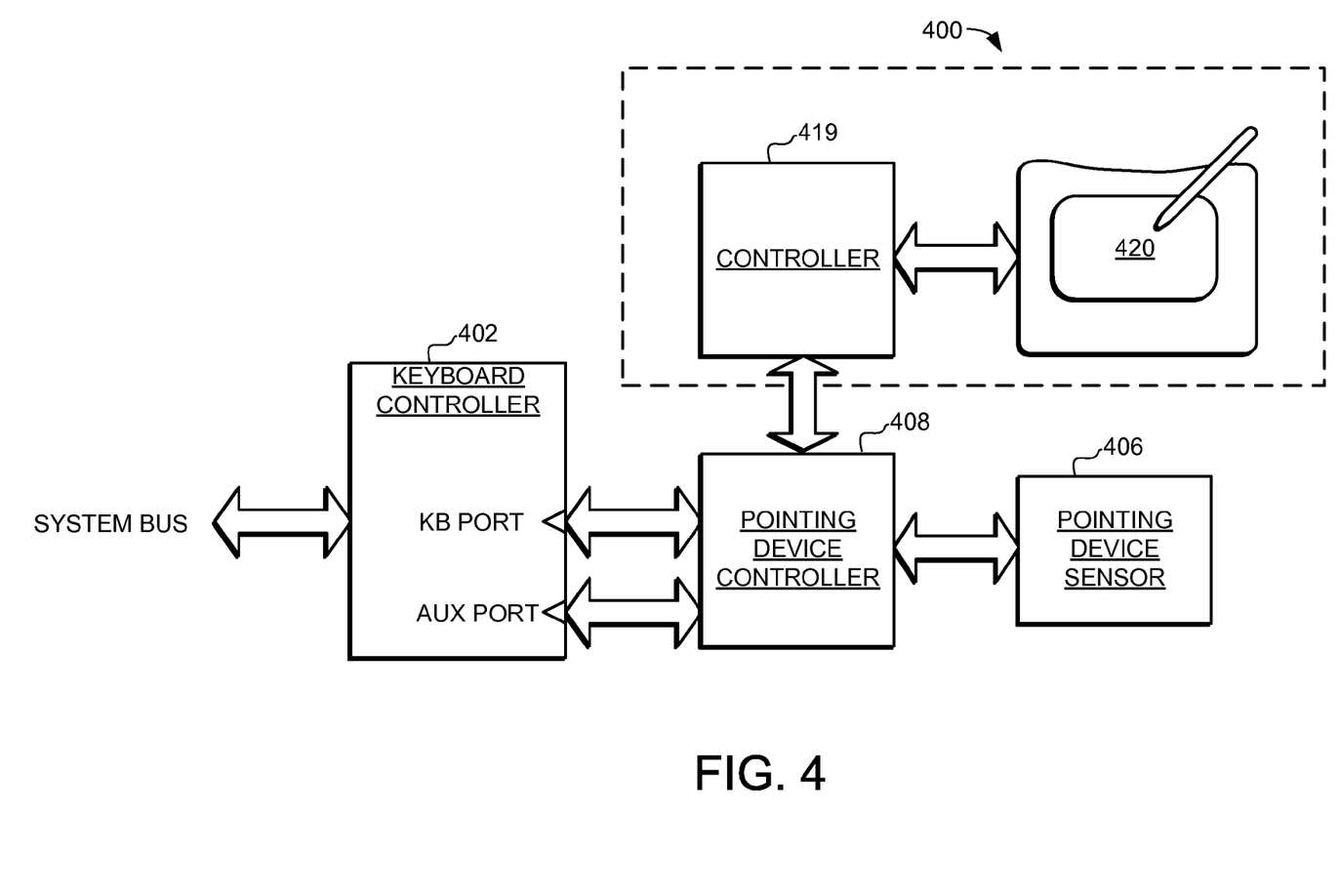

In some applications the simulated keyboard information and the object positional information can be routed through the controller of another pointing device. Turning now to FIG. 4, a third embodiment of a proximity sensor device 400 is illustrated. The proximity sensor device 400 includes a controller 419 and a sensing region 420. Unlike the previous embodiments, the proximity sensor device 400 is coupled to the keyboard controller 402 through an intermediate pointing device controller 408. The pointing device controller 408 thus serves as the controller for the pointing device sensor 406, as well as providing for the routing of data from the proximity sensor device 400. In the embodiment illustrated in FIG. 4, the keyboard controller 402 includes a keyboard port and an auxiliary port, and both of these ports are coupled to the pointing device controller 408.

In general, this type of implementation is particularly useful in applications where the keyboard controller has a limited number of auxiliary ports available for use. Specifically, because this embodiment allows both the pointing device 406 and the proximity sensor device 400 to "share" an auxiliary input, it allows for the implementation on keyboard controllers that do not have an extra auxiliary input available. Furthermore, because the pointing device controller 408 receives and outputs data from both the pointing device 406 and the proximity sensor device 400, it can combine and format the data appropriately. For example, it can encapsulate or use marking bits to identify the source of positional information before sending it to the keyboard controller. This encapsulation or use of marking bits can then be used by the specialized host software to identify the source of the data. This is beneficial in that not all keyboard controllers can by themselves effectively deal with positional information arriving from two sources simultaneously.

As with the other embodiments, the proximity sensor device 400 is configured to output simulated keyboard information responsive to detected object presence and is further configured to output object positional information in response to detected object presence. In this example, when operating in a first mode prior to the specialized host software loading, the controller 419 outputs the simulated keyboard information to the pointing device controller 408. The pointing device controller 408 formats this information, and passes it to the keyboard controller 402 through the keyboard port KB PORT. At the keyboard controller 402, the simulated keyboard information is interpreted in manner similar to scan codes from a normal keyboard. Thus, prior to the specialized host software the loading, the proximity sensor device 400 emulates the behavior of a keyboard, and allows a user to cause one or more control functions indicated by the scan codes to be performed on the host electronic device.

Figure 5:
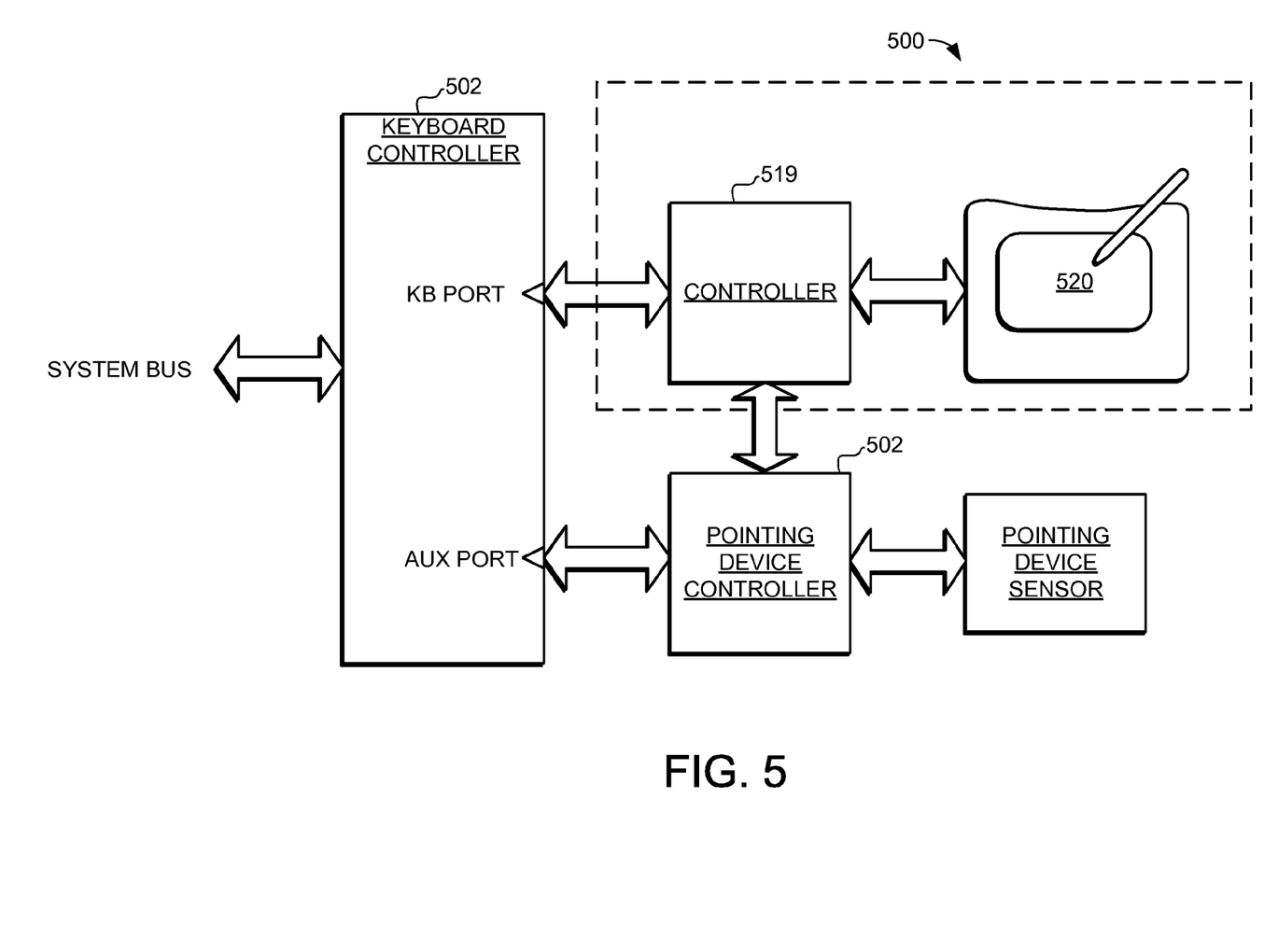

Then, when operating in a second mode after the specialized host software has been loaded, the controller 419 outputs object positional information. For example, after loading of the specialized host software, the host electronic system will direct the controller 419 to pass positional information to the pointing device controller 408, which formats and passes it to the keyboard controller 402 through the auxiliary port AUX PORT. This information is processed by the keyboard controller 402, and is passed to the host electronic device, where the specialized host software is used to interpret the positional information. Thus, after loading of the specialized host software, the proximity sensor device 400 can be used to provide the full available range of user interface functions based on the positional information from the proximity sensor device. In other embodiments the controller 419 can be configured to always present both keyboard information and position information to pointing device controller 408, which would then selectively send one or the other, or both, to the keyboard controller, typically sending only keyboard information by default, but being later commanded to send positional information by a device driver In a variation on this embodiment, the object positional information is routed through the pointing device controller, while simulated keyboard information is passed directly to the keyboard controller. Turning now to FIG. 5, a fourth embodiment of a proximity sensor device 500 is illustrated. The proximity sensor device 500 includes a controller 519 and a sensing region 520. Like the previous embodiment, the proximity sensor device 500 is coupled to the keyboard controller 502 through an intermediate pointing device controller 508. However, unlike the previous embodiment, the proximity sensor device 500 is also directly coupled to the keyboard controller 502. Specifically, the controller 519 is coupled to the keyboard port KB PORT on the keyboard controller 502, while the pointing device controller 502 is coupled to the auxiliary port AUX PORT.

In general, this type of implementation is particularly useful in applications where the number of auxiliary ports on the keyboard controller is limited, or where the keyboard controller cannot effectively handle data from two pointing devices simultaneously.

Thus, in all the embodiments illustrated in FIGS. 2-5, the proximity sensor device controller is configured to output simulated keyboard information to a keyboard controller when operating in a first mode prior to the specialized host software loading. Then, when operating in a second mode after the specialized host software has been loaded, the proximity sensor device controller outputs object positional information to the keyboard controller. Thus, in each embodiment the proximity sensor device provides control functionality prior to the loading of the specialized host software, and a full available range of user interface functions after loading of the specialized host software.

Turning now to FIG. 6, an exemplary portable computer 600 is illustrated. The portable computer 600 is an example of the type of electronic device in which a proximity sensor device can be implemented. In the illustrated embodiment, the portable computer 200 is a "notebook" computer that includes a keyboard 604 and a pointing device 606 as user input devices. In this case, the pointing device 606 is a touch pad, commonly referred to as a proximity or touch sensor. Of course, this is just one example, and other implementations could use different pointing devices such as trackballs or a computer mouse. In accordance with an embodiment of the invention, the portable computer 600 also includes two exemplary proximity sensor devices 602a and 602b. The proximity sensor device 602a is located under the display of the portable computer 200, while proximity sensor device 602b is located above the keyboard. These are merely two examples of where and how proximity sensor devices can be implemented on laptop computing devices, any other shapes, sizes, and locations on the computing device are also possible. Furthermore, in many embodiments the computing device would be implemented with only one proximity sensor device, but a plurality of proximity sensor devices is also possible.

The proximity sensor devices 602 are configured to output simulated keyboard information (e.g., scan codes) to a keyboard controller (not shown) when operating in a first mode prior to the specialized host software on the computer 600 loading. Then, when operating in a second mode after the specialized host software of the computer 600 has been loaded, the proximity sensor devices 602 are configured to output object positional information (e.g., absolute or relative position information) to the keyboard controller. Thus, the proximity sensor devices 602 provide limited control functionality for the computer 600 prior to the loading of the specialized host software, and a full available range of user interface functions after loading of the specialized host software on the computer 600. Again, the computer device 600 is just one example of the type of electronic device on which the proximity sensor devices 602 can be implemented.

Figure 7:
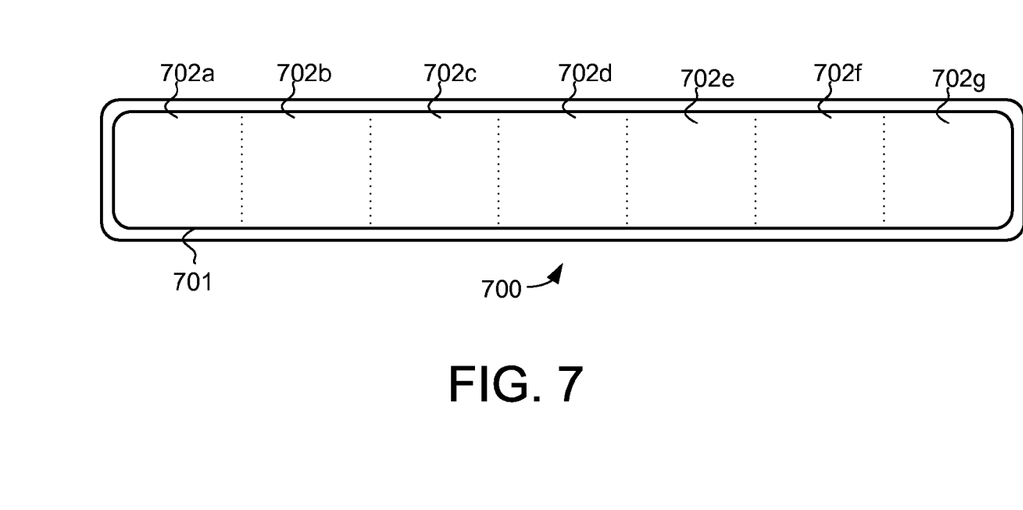
FIGS. 7-8 are schematic views of proximity sensor devices in accordance with the embodiments of the invention.

Turning now to FIG. 7, an example of a proximity sensor device 700 is illustrated. The proximity sensor device 700 is an example of the type of proximity sensor device that can be implemented in accordance with the embodiments of the invention. For example, proximity sensor device 700 could be implemented in the portable computer 600 illustrated in FIG. 6. The proximity sensor device 700 includes a controller (not shown) and is sensitive to objects in a sensing region. In the illustrated embodiment, the sensing region has a rectangular shape, and includes seven portions 702a-g As will be described above, these different portions are used to provide a plurality of different functions on the host electronic device.

When operating in a first mode prior to the specialized host software loading the proximity sensor device 700 outputs simulated keyboard information to the electronic device. In the illustrated embodiment, the proximity sensor device 700 can be implemented to generate a different scan code responsive to object proximity for each of the different portions 702a-g, with each scan code corresponding to a different control function. For example, object presence near portion 702a could cause a "stop" scan code to be generated, object presence near portion 702b could cause a "play" scan code to be generated, etc. Thus, the proximity sensor device could be used to provide controls for a media player on the electronic device, with each portion is associated with a different function on the media player.

Then, when operating in a second mode after the specialized host software has been loaded, the proximity sensor device 700 outputs positional information to the electronic device. There, the object positional information is interpreted by the specialized host software, and can be used to provide a range of user interface functions on the electronic device. For example, object motion across one or more portions 702a-g of the sensing region 701 can be used evaluated to determine the presence of specific gestures, such as hops, taps and double taps, or to distinguish between the number and type of objects in the sensing region. The specialized host software can then generate the appropriate user interface function, such as cursor control, scrolling, dragging, and panning. Thus, the proximity sensor device 700 provides control functionality prior to the loading of the specialized host software, and can be used to provide a full range of user interface functions after loading of the specialized host software.

It should be noted that while the proximity sensor device 700 includes a plurality of regions, that these regions could be all be implemented as part of one sensing device, and thus could share one or more electrodes depending on the sensing technology used. Alternatively, the proximity sensor device could be implemented with separate electrode patterns for each region, or combinations thereof.

Figure 8:
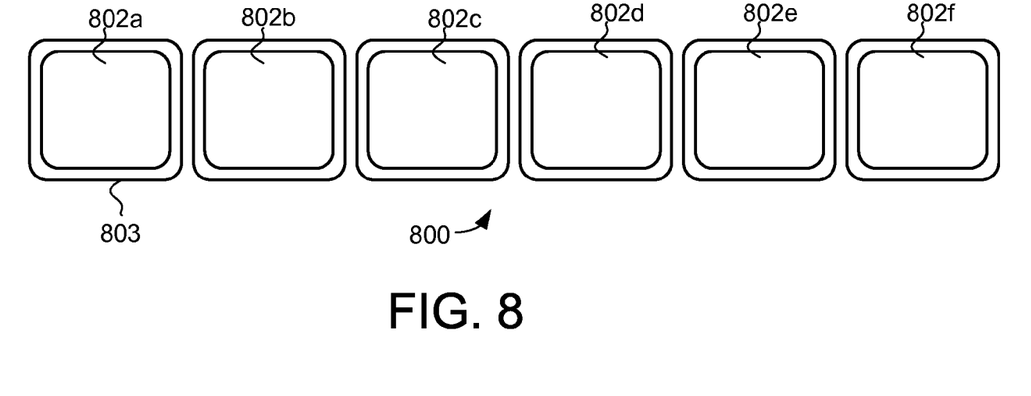

Furthermore, the sensitive surface of the proximity sensor device can be divided into one or more portions through the use of bezels and other indicators. Turning now to FIG. 8, a proximity sensor device 800 is illustrated where the sensing region includes a plurality of portion of portions 802a-g. In this embodiment, the various sensing portions are delineated by the presence of edge bezels around each portion. This can further indicate to the user the presence of the different portions. Again however, these portions can be implemented as part of the same sensor device, and thus could share one or more electrodes.

The embodiments of the present invention thus provide a proximity sensor device and method that facilitates improved device usability. Specifically, the proximity sensor device and method provide control functionality without requiring loading of specialized host software for the proximity sensor device. For example, the proximity sensor device can be used to provide a limited set of control functions prior to the specialized host software loading, and then switch to provide full functionality when the specialized host software has been loaded.

The embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit of the forthcoming claims.

What is claimed is:

1. A user interface device, the user interface device comprising:
   a proximity sensor, the proximity sensor adapted to detect object presence proximate a sensing region; and
   a controller, the controller coupled to the proximity sensor, the controller configured to:
      selectively operate in a first mode during startup of an associated computing device, before loading of driver software for the user interface device on the associated computing device, and operate in a second mode after loading of the driver software when directed to by the driver software;
      output simulated keyboard information indicating a function responsive to a first detected object presence proximate the sensing region when operating in the first mode; and
      output object positional information responsive to a second detected object presence proximate the sensing region when operating in the second mode.

2. The user interface device of claim 1 wherein the simulated keyboard information comprises a keyboard scan code indicating the function.

3. The user interface device of claim 1 wherein the controller is configured to output the simulated keyboard information to a keyboard port on a keyboard controller, and wherein the controller is configured to output the object positional information to an auxiliary port on the keyboard controller.

4. The user interface device of claim 3 wherein the keyboard port comprises a first configurable multifunction port and wherein and the auxiliary port comprises a second configurable multifunction port.

5. The user interface device of claim 3 wherein the keyboard controller comprises a PS/2-compatible multiplexing keyboard controller.

6. The user interface device of claim 1 wherein the controller is configured to output the simulated keyboard information to a dynamically configurable multifunction port on keyboard controller, and wherein the controller is configured to output the object positional information to the dynamically configurable multifunction port on the keyboard controller.

7. The user interface device of claim 1 wherein the sensing region includes a plurality of portions, and wherein the controller is configured to output the simulated keyboard information by outputting a scan code indicating a function corresponding to a portion of the sensing region in which the detected object presence occurs.

8. A user interface device for a computing device, the user interface device comprising:
   a proximity sensor, the proximity sensor adapted to detect object presence proximate a sensing region, the sensing region including a plurality of portions; and
   a sensor controller, the sensor controller coupled to the proximity sensor, the sensor controller configured to:
      selectively operate in either a first mode and a second mode, wherein the sensor controller is configured to operate in the first mode during startup of the computing device, before loading of a driver software for the user interface device on the computing device, and wherein the sensor controller is configured to operate in the second mode after loading of the driver software;

associate a scan code in a plurality of scan codes to a corresponding portion in the plurality of portions in the sensing region, where each of the plurality of scan codes indicates a corresponding function on the electronic device;

generate the associated scan code responsive to detected object presence in the corresponding portion of the sensing region and output generated scan codes to a keyboard port on a keyboard controller in the computing device when the sensor controller operates in the first mode; and generate object position data responsive to detected object presence proximate the sensing region when the sensor controller and output the generated object position data to an auxiliary port on the keyboard controller in the computing device when the controller operates in the second mode.

9. The user interface device of claim 8 wherein the keyboard controller includes a second keyboard port for coupling to a keyboard, and wherein the keyboard controller includes a second auxiliary port for coupling to a pointing device.

10. A method of indicating user interface results from a sensor adapted to detect object presence proximate a sensing region, the method comprising:
  generating simulated keyboard information indicating a function responsive to a first detected object presence proximate the sensing region when operating in a first mode during startup of an associated computing device, before loading of a driver software for the sensor on the associated computing device;
  outputting the simulated keyboard information to a keyboard controller when operating in the first mode;
  switching from the first mode to a second mode in response to the loading of the driver software;
  generating object position data responsive to a second detected object presence proximate the sensing region when the sensor controller operates in the second mode; and
  outputting the object position data to the keyboard controller when operating in the second mode.

11. The method of claim 10 wherein the simulated keyboard information comprises an IBM PC compatible keyboard scan code.

12. The method of claim 10 wherein the step of outputting the simulated keyboard information to the keyboard controller when operating in the first mode comprises outputting to a keyboard port on the keyboard controller; and wherein the step of outputting the object position data to the keyboard controller when operating in the second mode comprises outputting to an auxiliary port on the keyboard controller.

13. The method of claim 10 wherein the step of outputting the simulated keyboard information to the keyboard controller when operating in the first mode comprises outputting to a dynamically configurable multifunction port on the keyboard controller; and wherein the step of outputting the object position data to the keyboard controller when operating in the second mode comprises outputting to the dynamically configurable multifunction port on the keyboard controller.

14. A program product comprising:
  a) a proximity sensor program, the proximity sensor program adapted to receive an indication of detected object presence proximate a sensing region in a proximity sensor device, the proximity sensor program further adapted to selectively operate in a first mode during startup of an associated computing device, before loading of a driver software for the user interface device on the associated computing device and operate in a second mode after loading of the driver software when directed to by the driver software, the proximity sensor program further adapted to output simulated keyboard information indicating a function responsive to a first detected object presence proximate the sensing region, the proximity sensor program further configured to output object positional information responsive to a second detected object presence proximate the sensing region; and
  b) non-transitory computer-readable media bearing said proximity sensor program.

15. The program product of claim 14 wherein the simulated keyboard information comprises a keyboard scan code indicating the function.

16. The program product of claim 14 wherein the simulated keyboard information is outputted to a keyboard port on a keyboard controller, and wherein the object positional information is outputted to an auxiliary port on the keyboard controller.

17. The program product of claim 16 wherein the keyboard port comprises a first configurable multifunction port and wherein and the auxiliary port comprises a second configurable multifunction port.

18. The program product of claim 16 wherein the keyboard controller comprises a PS/2-compatible multiplexing keyboard controller.

19. The program product of claim 14 wherein the simulated keyboard information is outputted to a dynamically configurable multifunction port on keyboard controller, and wherein the object positional information is outputted to the dynamically configurable multifunction port on the keyboard controller.

20. The program product of claim 14 wherein the sensing region includes a plurality of portions, and wherein the proximity sensor program is configured to output the simulated keyboard information by outputting a scan code indicating a function corresponding to a portion of the sensing region in which the detected object presence occurs.

21. The program product of claim 14 wherein the proximity sensor program is further configured to selectively operate in either of a first mode and a second mode, and wherein the proximity sensor program is configured to output the simulated keyboard information indicating the function responsive to the first detected object presence proximate the sensing region when operating in the first mode, and wherein the proximity sensor program is configured to output the object positional information responsive to the second detected object presence proximate the sensing region when operating in the second mode.

* * * * *